United States Patent
Luss et al.

(10) Patent No.: US 11,640,532 B2
(45) Date of Patent: *May 2, 2023

(54) CONTRASTIVE EXPLANATIONS FOR IMAGES WITH MONOTONIC ATTRIBUTE FUNCTIONS

(71) Applicant: International Business Machines Corporation, Armonk, NY (US)

(72) Inventors: Ronny Luss, New York, NY (US); Pin-Yu Chen, White Plains, NY (US); Amit Dhurandhar, Yorktown Heights, NY (US); Prasanna Sattigeri, Acton, MA (US); Karthikeyan Shanmugam, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,480

(22) Filed: Dec. 3, 2021

(65) Prior Publication Data

US 2022/0092360 A1      Mar. 24, 2022

Related U.S. Application Data

(63) Continuation of application No. 16/549,394, filed on Aug. 23, 2019, now Pat. No. 11,222,242.

(51) Int. Cl.
*G06V 10/764* (2022.01)
*G06N 3/08* (2023.01)
(Continued)

(52) U.S. Cl.
CPC ............. *G06N 3/08* (2013.01); *G06F 18/217* (2023.01); *G06F 18/2148* (2023.01);
(Continued)

(58) Field of Classification Search
CPC ....................................................... G06N 3/08
See application file for complete search history.

(56) References Cited

U.S. PATENT DOCUMENTS

| 11,222,242 B2* | 1/2022 | Luss | G06N 3/08 |
| 2016/0180183 A1* | 6/2016 | Bourdev | G06V 10/761 |
| | | | 382/115 |

(Continued)

OTHER PUBLICATIONS

List of all IBM related dockets, 2021.

*Primary Examiner* — Edward Park
(74) *Attorney, Agent, or Firm* — Garg Law Firm, PLLC; Rakesh Garg; Peter Edwards

(57) ABSTRACT

In an embodiment, a method for generating contrastive information for a classifier prediction comprises receiving image data representative of an input image, using a deep learning classifier model to predict a first classification for the input image, evaluating the input image using a plurality of classifier functions corresponding to respective high-level features to identify one or more of the high-level features absent from the input image, and identifying, from among the high-level features absent from the input image, a pertinent-negative feature that, if added to the input image, will result in the deep learning classifier model predicting a second classification for the modified input image, the second classification being different from the first classification. In an embodiment, the method includes creating a pertinent-positive image that is a modified version of the input image that has the first classification and fewer than all superpixels of the input image.

20 Claims, 7 Drawing Sheets

(51) Int. Cl.
*G06F 18/21* (2023.01)
*G06F 18/22* (2023.01)
*G06F 18/214* (2023.01)
*G06F 18/2431* (2023.01)
*G06V 10/82* (2022.01)

(52) U.S. Cl.
CPC .......... *G06F 18/22* (2023.01); *G06F 18/2431* (2023.01); *G06V 10/764* (2022.01); *G06V 10/82* (2022.01)

(56) References Cited

U.S. PATENT DOCUMENTS

2019/0362233 A1* 11/2019 Aizawa ................ G06N 3/084
2021/0012127 A1* 1/2021 Chen .................... G06K 9/6232

* cited by examiner

| CLASSIFICATION 502 | INPUT IMAGE 508 | PERTINENT NEGATIVE 510 | PERTINENT POSITIVE 512 |
|---|---|---|---|
| SHIRT |  | COAT  |  |
| CONTRASTIVE EXPLANATIONS 506 | | + WIDER SLEEVES, WAIST | 15 PIX |
| TROUSER |  | DRESS  |  |
| CONTRASTIVE EXPLANATIONS 506 | | − MIDDLE PIECE OF FABRIC | 398 PIX |

CONTRASTIVE EXPLANATIONS FOR IMAGES WITH MONOTONIC ATTRIBUTE FUNCTIONS

TECHNICAL FIELD

The present invention relates generally to machine learning. More particularly, the present invention relates to explaining deep learning systems.

BACKGROUND

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

A Deep Learning Neural Network, referred to herein as a Deep Neural Network (DNN) is an artificial neural network (ANN) with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

SUMMARY

The illustrative embodiments provide a method, system, and computer program product for explaining machine learning models. In an embodiment, the method includes receiving, by one or more processors, image data representative of an input image, predicting, by one or more processors, using a DNN classifier model, a first classification for the input image, evaluating, by one or more processors, the input image using a plurality of classifier functions corresponding to respective high-level features to identify one or more of the high-level features absent from the input image, and identifying, by one or more processors, from among the high-level features absent from the input image, a pertinent-negative feature that, if added to the input image, will result in the DNN classifier model predicting a second classification for the modified input image, the second classification being different from the first classification.

An embodiment includes a computer usable program product for generating contrastive information for a classifier prediction, the computer usable program product comprising a computer-readable storage device, and program instructions stored on the storage device, the stored program instructions comprising program instructions to receive, by one or more processors, image data representative of an input image, program instructions to predict, by one or more processors, using a DNN classifier model, a first classification for the input image, program instructions to evaluate, by one or more processors, the input image using a plurality of classifier functions corresponding to respective high-level features to identify one or more of the high-level features absent from the input image, and program instructions to identify, by one or more processors, from among the high-level features absent from the input image, a pertinent-negative feature that, if added to the input image, will result in the DNN classifier model predicting a second classification for the modified input image, the second classification being different from the first classification. In an embodiment, the method includes creating a pertinent-positive image that is a modified version of the input image that has the first classification and fewer than all superpixels of the input image.

In an embodiment, a computer system comprising a processor, a computer-readable memory, and a computer-readable storage device, and program instructions stored on the storage device for execution by the processor via the memory, the stored program instructions comprising program instructions to receive, by one or more processors, image data representative of an input image, program instructions to predict, by one or more processors, using a DNN classifier model, a first classification for the input image, program instructions to evaluate, by one or more processors, the input image using a plurality of classifier functions corresponding to respective high-level features to identify one or more of the high-level features absent from the input image, and program instructions to identify, by one or more processors, from among the high-level features absent from the input image, a pertinent-negative feature that, if added to the input image, will result in the DNN classifier model predicting a second classification for the modified input image, the second classification being different from the first classification.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
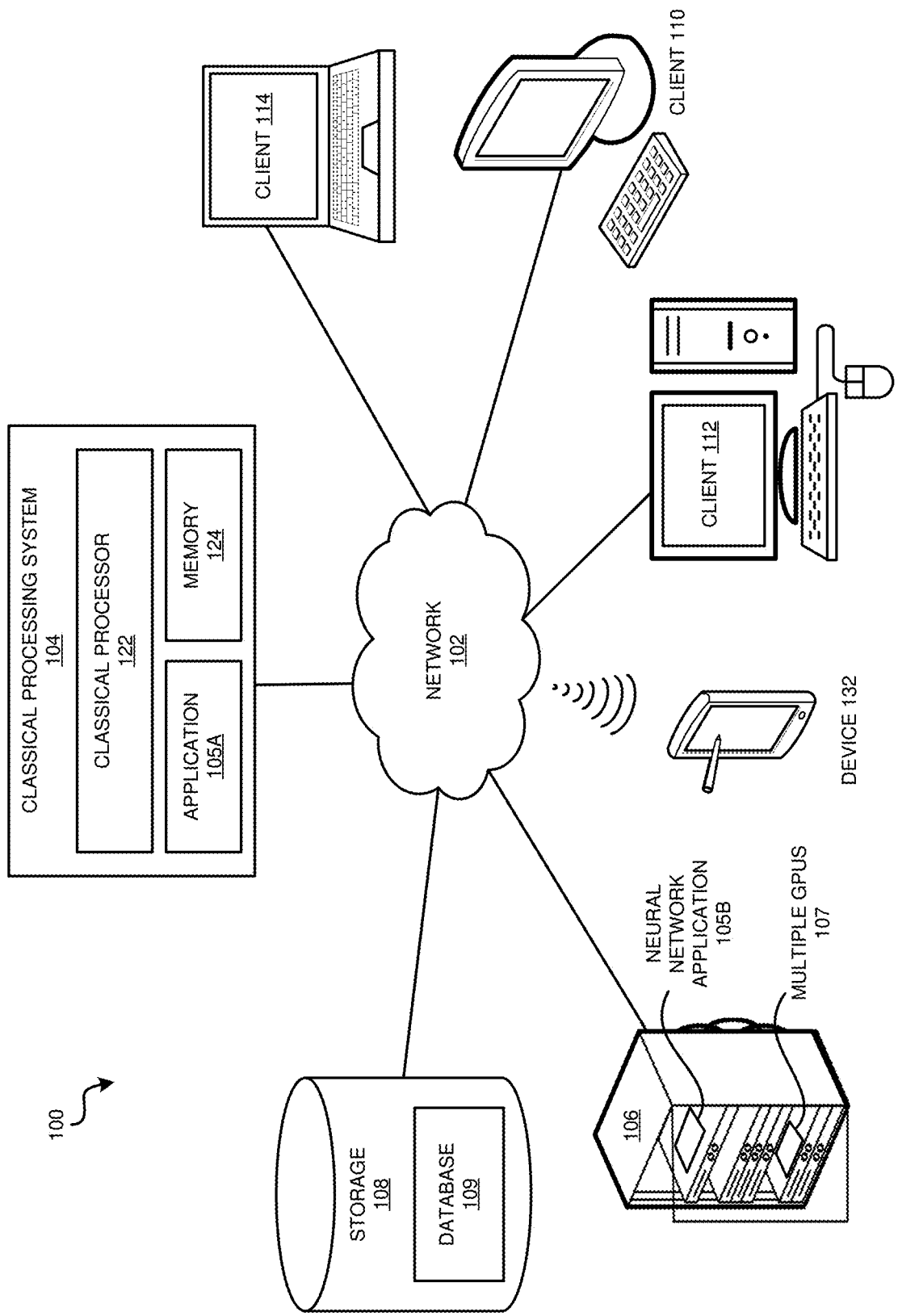
FIG. 1 depicts a block diagram of a network of data processing systems in which illustrative embodiments may be implemented.

In recent years, DNNs have demonstrated the ability to make remarkably accurate predictions and have emerged as the state-of-the-art in machine learning models. DNNs now outperform other methods in several areas, including applications involving image recognition, such as computer vision and image classification. This translates to tremendous potential for the use of DNNs in many different industries, including the medical and transportation industries. For example, DNNs show promise for applications such as medical imaging and self-driving vehicles. However, the benefit DNNs bring is currently seen as coming with some amount of risk due to the difficulty involved in understanding how exactly DNNs arrive at their predictions. This is sometimes referred to as the "black box" problem of DNNs: while they consistently demonstrate amazing accuracy, there remains a degree of mistrust because the predictions are based on a process that is not readily understood. For example, in the medical industry, DNNs have outperformed human counterparts at evaluating medical imagery or developing care plans based on lengthy patient records. However, the illustrative embodiments recognize that if a physician reviewing the DNN's prediction has no way of understanding the reasoning that led to the conclusion, it becomes difficult for the physician to decide how much confidence to place on the DNN's prediction. Thus, the illustrative embodiments recognize that mistrust due to an absence of explanation for a DNNs prediction presents an obstacle to adoption of DNNs particularly in areas like medical and transportation applications where health and safety are put at risk if predictions are wrong.

The illustrative embodiments recognize that there is a need to improve the transparency of Deep Neural Network (DNN) decision-making by providing humanly-interpretable explanations of predictions made by DNNs. For example, a physician reviewing a prediction made by a DNN of whether a medical image indicates a medical condition has only the inscrutable prediction of the DNN and therefore cannot be certain whether it was a close call or which areas of the image most contributed to the DNN's prediction. Without the ability to understand the rationale behind the DNN's prediction, the physician's decision-making ability might be hampered or adversely altered. For example, the physician might ordinarily err on the side of caution and treat a close negative result, but fail to do so when not aware of the close, and therefore potentially erroneous, nature of a prediction made by the DNN.

Understanding why a DNN made one particular prediction instead of another is also important in developing future machine learning models. For example, a DNN classifier that is making erroneous predictions can be difficult to troubleshoot with only the erroneous inscrutable prediction. In a case where the errors stem from an adversarial attack on the DNN, the rationale for the erroneous decision might aid in better understanding the nature of the adversarial attack and how to defend from such an attack in the future.

In addition, DNNs have the potential to improve many different security applications, such as at airports or other secure areas. For example, a DNNs have shown potential for security applications such as facial recognition, retina scanning, and biometric scanning. Security applications such as these present challenges due to the potential threat of adversarial attacks or other attempts to bypass security by causing the DNN to make erroneous predictions. The rationale of the DNN that is contributing to the erroneous predictions can help improve the robustness of such systems to make such attacks more difficult.

The illustrative embodiments recognize that the presently available tools or solutions do not address these needs or provide adequate solutions for these needs. The illustrative embodiments used to describe the invention generally address and solve the above-described problems and other problems related to improving the transparency of DNN decision-making by providing humanly-interpretable explanations of predictions made by DNNs.

An embodiment can be implemented as a software application. The application implementing an embodiment can be configured as a modification of an existing image analysis system, as a separate application that operates in conjunction with an existing image analysis system, a standalone application, or some combination thereof.

Particularly, some illustrative embodiments provide a method that utilizes a DNN classifier to classify an original image, and then generates an altered version of the original image that includes at least one high-level feature that serves as a humanly-interpretable contrastive explanation for the DNN's classification of the original image. In some such embodiments, the altered version of the original image is a "Pertinent Negative" (or "PN") image that is humanly-interpretable, from which nothing has been removed (i.e., no portion of the original image has been removed), and in which at least one high-level feature (that is also humanly-interpretable) has been added that results in both a relatively small change to the original image and a different classification prediction by the DNN classifier.

A distinction between two classifications of images is now made for purposes of clarity. A first classification of images are those that are machine recognizable at any level of detail, whereas a second classification of images are those that are recognizable to the typical human eye without the aid of a machine. A microscopic image that is too small to be discerned by an unaided human eye, but can be seen with the help of a microscope, is an example of the first classification of images. An image that can serve as a humanly-interpretable explanation is an example of the second classification of images because a humanly-interpretable explanation in the form of a digital image is a visible image, meaning that it is large enough that a typical unaided human eye can discern the image without the aid of a machine. Hereinafter, any reference to humanly recognizable, or humanly interpretable, or humanly readable, and other human-ability related terms refer to such operations or actions relative to artifacts falling in the second classification. The term "high-level feature," as used herein, generally refers to depictions in the second classification of images, and are thus humanly-detectable images or depictions of objects in an image, such as humanly-recognizable shapes or items. Images include two types of features: "high-level features" and "low-level features." Low-level features are the fine details of an image, such as line segments or dots. Low-level features sometimes serve as building blocks for high-level features. High-level features in an image can be detected by a DNN. Low level features in an image, such as lines or dots, can be detected by a convolutional filter, a Histogram of Oriented Gradients (HOG), or a Scale Invariant Feature Transform (SIFT). A HOG breaks patches up in blocks, and then constructs histograms representing gradient in the block. A SIFT transforms an image into a large collection of local-feature vectors (local descriptors called SIFT keys), and is sometimes is used for feature transformation of image.

For example, in some embodiments, a DNN includes multiple layers between the input and output ports. In such embodiments, the architecture of a DNN is arranged such that different layers detect patterns with different scales of granularity. For example, in some embodiments, on a low level, this includes detecting low-level features, such as specific pixel patterns, for example corners, lines, or dots. On a high level, this includes detecting high-level features such as detecting of patterns, faces, or graphical indicia (e.g., text, logos, or emoticons), like that a person is detected in the image or that a message expresses happiness.

For an alternative basis for understanding the DNN classifier's rationale, some embodiments provide a method that utilizes a DNN classifier to classify an original image, and then generates an altered version of the original image to which nothing has been added but from which areas have been removed. The portion of the original image that remains is indicative of one or more areas of the original image that the DNN treated as significant in predicting a classification of the original image. In some such embodiments, the altered image is a "Pertinent Positive" (or "PP") image that is humanly-interpretable, which is an altered version of the original image to which nothing has been added, and from which regions of the image have been removed such that the remaining regions represent features (that are also humanly-interpretable) that are minimally sufficient for the DNN classifier to continue to predict the same classification as that of the original image.

Still further embodiments allow for an understanding of the DNN classifier's rationale that is based on more than one humanly-interpretable contrastive explanation. For example, some embodiments provide a method that utilizes a DNN classifier to classify an original image, and then generates a humanly-interpretable PN image, which is an altered version of the original image from which nothing has been removed and in which at least one high-level feature (that is also humanly-interpretable) has been added that results in both a relatively small change to the original image and a different classification prediction by the DNN classifier, and also generates a humanly-interpretable PP image, which is an altered version of the original image to which nothing has been added, and from which regions of the image have been removed such that the remaining regions represent features (that are also humanly-interpretable) that are minimally sufficient for the DNN classifier to continue to predict the same classification as that of the original image.

The term "contrastive explanation," as used herein, generally refers to an explanation that describes why a decision was made by describing a difference in circumstances that would result in a different decision. For example, in some embodiments, a contrastive explanation for a DNN prediction includes a PN, which is a high-level feature that, when added to an original image, alters the original image less than when certain other high-level features are added and causes the DNN classifier to predict a classification for the altered image that differs from that of the original image. As another example, in some embodiments, a contrastive explanation for a DNN prediction includes a PP, which generally refers to one or more areas of an original image that are indicative of what the DNN classifier considers to be is minimally sufficient to justify the classifier's predicted classification for the original image, e.g., the parts (e.g., minimal pixels) that keep an image in its current class when evaluated by a particular classifier.

An embodiment configures an image classification model to classify a subject viewed or captured by an image capturing device, which can be any device capable of generating a digital image, such as a camera, x-ray scanner, Magnetic resonance imaging (MRI) scanner, or computerized tomography (CT) scanner. The subject may be viewed in real time or captured and viewed at a later time. In one embodiment, the image classification model is a DNN. During the configuration process, an embodiment uses labelled images of various subjects to train the neural network-based model to classify a subject of an image according to the training. For example, an image classification model that is intended to classify an image subject as either a human face or something other than a human face could be trained using a set of images labelled as including a human face and another set of images labelled as not including a human face. As another example, an image classification model that is intended to classify an image subject into one of a set of known household objects (e.g. chairs, books, tables, televisions, remote controls, sofas, etc.) could be trained using a set of images labelled as including a particular known household object and another set of images labelled as not including a particular known household object.

An embodiment provides a method that utilizes a DNN classifier to classify an original image, and then generates a humanly-interpretable PN image, which is an altered version of the original image from which nothing has been removed and in which at least one high-level feature (that is also humanly-interpretable) has been added that results in both a relatively small change to the original image and a different classification prediction by the DNN classifier.

Other image classification models and depth classification models, both neural network-based and not utilizing a neural network, are also possible and contemplated within the scope of the illustrative embodiments. Other configuration methods for each model, using unsupervised learning or using a set of learned or static rules, are also possible and contemplated within the scope of the illustrative embodiments. In addition, one embodiment can implement model configuration as a one-time process, and another embodiment can implement model configuration on an ongoing basis, allowing additional model refinement as an embodiment is used to classify an object in a scene.

Some embodiments configure the classifier models using one system, then execute the configured models using a different system, and generate a contrastive explanation using yet another system. Such embodiments provide for systems to be tailored or chosen based on a narrower range of tasks, allowing for more efficient use of resources. Such embodiments also allow for parallel performance of certain tasks, such as generating the PN and PP simultaneously or during time frames that overlap for applicable embodiments. Alternatively, in some embodiments, a single system can be used to perform the whole process.

In some embodiments, a specialized apparatus that includes an image capturing device for generating an original image is further configured to execute at least some of the other tasks disclosed herein. For example, a CT scanner combines a series of X-ray images taken from different angles around a body and uses computer processing to create cross-sectional images (slices) of the bones, blood vessels and soft tissues inside your body. Some embodiments can include a CT scanner having computer processing system integrated therewith or in communication therewith that is configured to perform at least some of the tasks disclosed herein. Other examples of specialized equipment that can be include at least some of the functionality described herein include other medical equipment, for example MRI scanners, or security equipment, for example security screening systems or security cameras.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
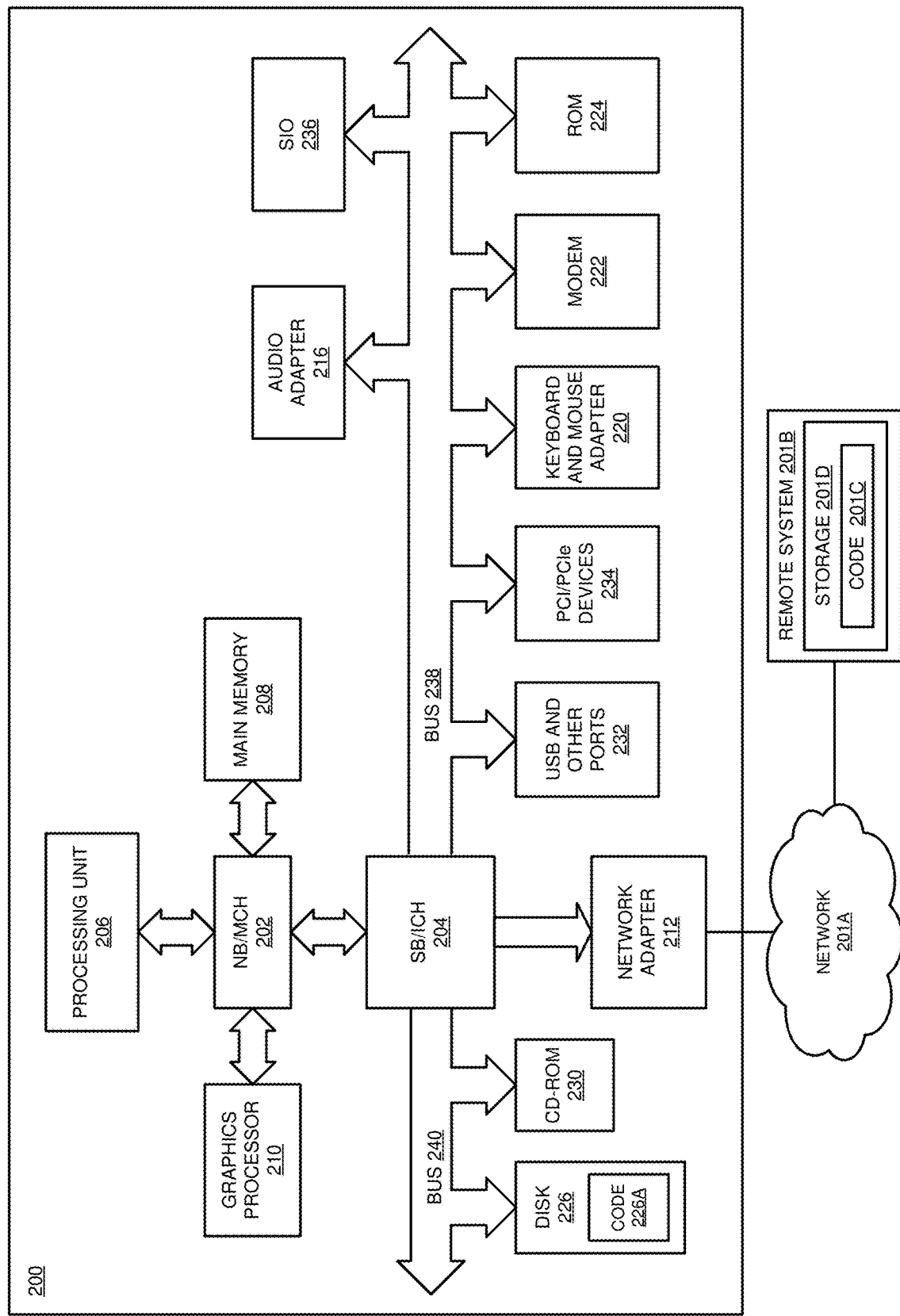
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto.

Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
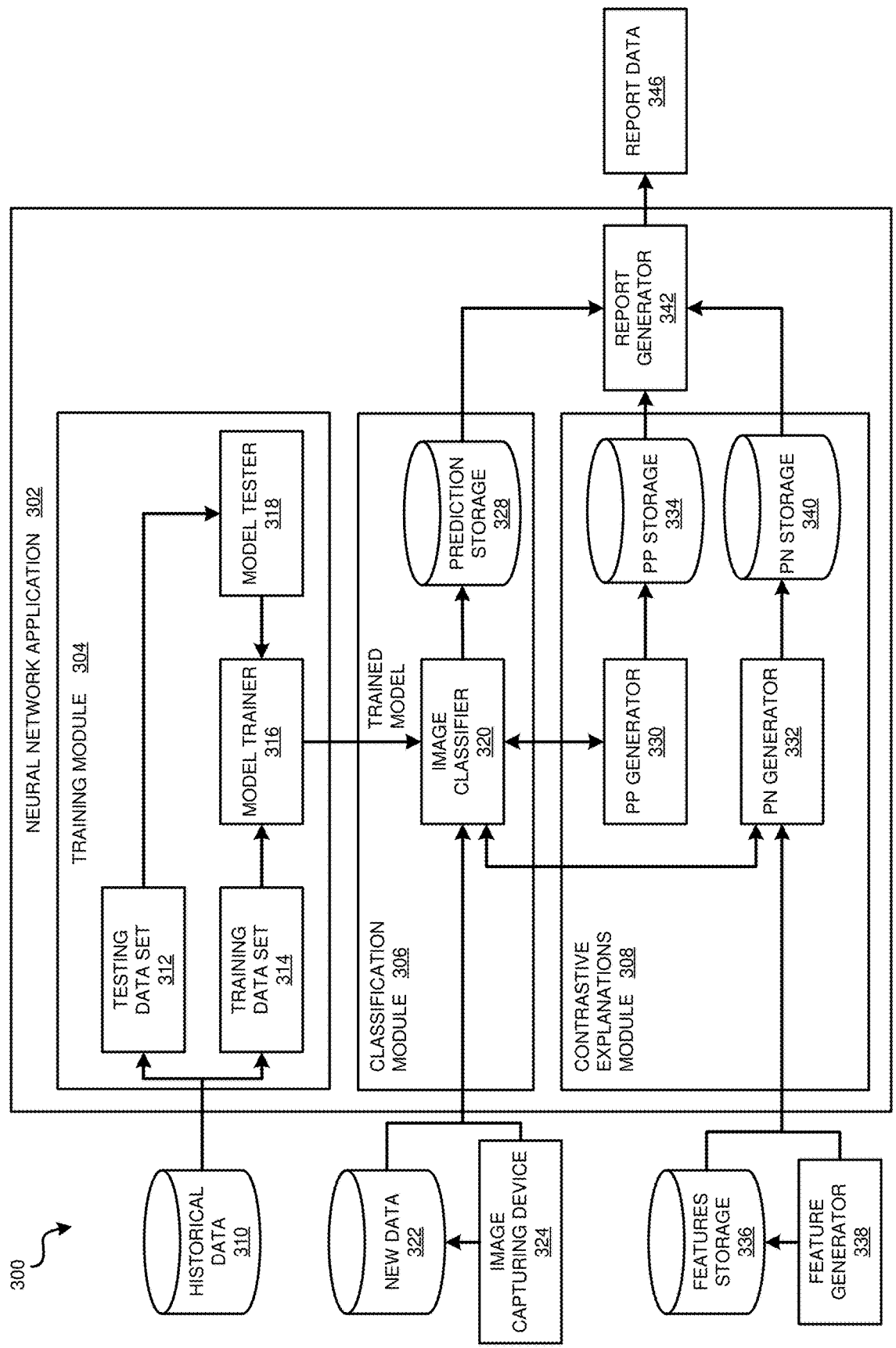
FIG. 3 depicts a block diagram of an example configuration for providing an artificial intelligence prediction of a classification of an image along with contrastive explanations for the prediction.

With reference to FIG. 3, this figure depicts a block diagram of an example configuration 300 in accordance with an illustrative embodiment. The example embodiment includes a neural network application 302. In a particular embodiment, application 302 is an example of application 105A/105B of FIG. 1.

In some embodiments, the neural network application 302 includes a training module 304, a classification module 306, and a contrastive explanations module 308. In alternative embodiments, the neural network application 302 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the training module 304 generates a classifier model based on a DNN. In an embodiment, the DNN is selected from, and/or based on one or more known deep learning neural network structures/systems. In an embodiment, training module 304 includes a model trainer 316 that trains the DNN using training data 314 appropriate for the current domain being modeled. For example, in an embodiment, the classification model is intended to classify articles of clothing, model trainer 316 trains the classification model using images showing various articles of clothing, for example the well-known Fashion-MNIST fashion product database developed by Zalando SE (Fashion-MNIST or any mark associated with it is the property of Zalando SE). Also, models generated based on a DNN may be referred to as deep learning models or deep neural network models (DNN models).

In some embodiments, the training module 304 receives historical data from a historical data storage 310 and uses the historical data to generate a trained machine-learning model for use by the classification module 306. The term "historical data," as used herein, refers to data that is familiar to users seeking to train a machine-learning model. For example, in some embodiments, the historical data includes a training dataset designed to train a machine-learning model that will be able to generalize enough to accurately make predictions about new data, for example about features or objects that are not part of the training dataset. In some embodiments, the training module 304 receives historical data from a data storage 310 and divides it into a training data set 312 and a testing data set 314 so that the trained model can be tested for problems, such as overfitting, before the trained model is ready for consumers.

In some embodiments, the training module 304 includes a model trainer 316 that receives the training data 314 and tries to "learn" from it by creating generalized mappings between input and output data for making predictions for new inputs where the output variable is unknown. In some embodiments, the model trainer 316 uses any of a variety of known algorithms having tunable parameters that are adjusted during the training phase to improve the accuracy of the model's predicted outputs for new inputs.

In some embodiments, the training module 304 includes a model tester 318 that monitors the model's ability to make predictions for the testing data set 312. For example, in some embodiments, the testing data set 312 includes data that has not been processed by the machine-learning model in order to allow the model tester 318 to evaluate the model's ability to generalize and accurately make predictions about the new data of the historical data set 312.

In some embodiments, the classification module 306 receives input image data representative of one or more original images. In some embodiments, the input image data, which refers to image data input from a user or other system or application to the classification module 306, for example from new data storage 322 or image capturing device 324. In an embodiment, input image data is provided to the classification module 306 as a real-time data stream. Also, in an embodiment, input image data is a collection of data, for example, data stored in a database, file system, or the like, or combination thereof. In an embodiment, the classification module 306 pre-processes the input image data, or receives the input image data after pre-processing by another system or application, before using the model for classification of the input image data. In an embodiment, the pre-processing includes normalization of data, formatting, cleanup, or the like, or combination thereof.

In some embodiments, the classification module 306 uses the trained model to infer and make predictions about the input image data. For example, in some embodiments, the image classifier 320 assigns a class or label to an image. In some embodiments, the image classifier 320 assigns a class or label to a group of pixels using a segmentation algorithm. In an embodiment, the image classifier 320 predicts classifications for images of the input image data and stores the classified image data in prediction storage 328. In some embodiments, the image classifier 320 classifies images in the image data according to characteristics of pixels or superpixels of images in the image data.

In some embodiments, the contrastive explanations module 308 includes one or both of a Pertinent Positive (PP) generator 330 and a Pertinent Negative (PN) generator 332 for generating contrastive explanations that serve as humanly-interpretable reasons for the classification predictions made by the image classifier 320. For example, in some embodiments, image classifier 320 includes a DNN classifier model, and the contrastive explanations module 308 generates contrastive explanations that serve as humanly-interpretable reasons for the classification predictions made by the DNN classifier model.

In some embodiments, the contrastive explanations module 308 automatically generates one or both of a PP image and a PN image for each original image that is classified by the image classifier 320. In some embodiments, the PP and PN images are modified versions of the original image. In some embodiments, the PP image is generated by removing areas of the original image without altering the remaining areas. In some embodiments, the PN image is generated by adding high-level features to the original image without altering or removing other areas of the image.

Thus, in some embodiments, the PP generator 330 modifies an original image to generate a corresponding pertinent positive image, which is a modified version of the original image in which modifications are limited to removing areas of the original image. Also, in some embodiments, the PN generator 332 modifies an original image to generate a corresponding pertinent negative image, which is a modified version of the original image in which modifications are limited to adding one or more high-level features.

In some embodiments, the PP image and the PN image provide visual cues indicative of image properties that were influential to the DNN classifier for its classification prediction for the original image. In some embodiments, the PN and PP images are solutions to respective optimization problems that are discussed in greater detail in connection with FIG. 4 below. For example, in some embodiments, to generate the PP image, the PP generator 330 searches for the smallest area of the original image that will still get the same classification by the DNN classifier as that of the original image. Also, in some embodiments, to generate the PN image, the PN generator 332 searches for the smallest area of the original image that can be changed (by addition of high-level feature(s)) to get a new classification by the DNN classifier that differs from that of the original image. Stated another way, the PN generator 332 searches for high-level feature(s) that cause the smallest change to the original image but still cause the DNN classifier to change the classification of the modified original image.

Thus, the PP image shows the area(s) of the original image that were influential to the DNN classifier because the displayed areas are those that need to remain in the original image to prevent the DNN from changing its classification. On the other hand, the PN image shows modified area(s) (as added high-level features) of a modified original image that were influential to the DNN classifier because the modified areas are those that need to remain modified in the modified original image to prevent the DNN from changing its classification back to that of the original image.

In some embodiments, the contrastive explanations module 308 only generates one or both of a PP image and a PN image original images when instructed to do so, for example based on user inputs or software instructions. In some embodiments, the contrastive explanations module 308 generates one or both of a PP version and a PN version of an original image in parallel with the classification of the original image by the image classifier 320. In some embodiments, the contrastive explanations module 308 generates one or both of a PP version and a PN version of an original image any time after image classifier 320 classifies the original image, but only while the original image and its classification are available, or can be provided to, the neural network.

In some embodiments, the PN generator 332 uses high-level features from features storage 322. In some embodiments, the features storage 322 is a third-party image database or other image provider of any kind. In some embodiments, the features storage 322 is a remote or external computer memory that stores the high-level features. In some embodiments, the PN generator 332 uses high-level features that are learned high-level features (i.e., disentangled representations). For example, in some embodiments, the model trainer 316 uses unsupervised training that results in a collection of high-level features learned from images in the training data set 314. Alternatively, in some embodiments, the feature generator 338 is a separate model trainer that uses unsupervised training to generate a collection of high-level features that are passed to the PN generator 332 for use in generating the PN images. In some embodiments, the feature generator 338 is a separate model trainer that uses a supervised extraction technique, where people manually label high-level features that are extracted to generate a collection of high-level features that are passed to the PN generator 332 for use in generating the PN images.

In some embodiments, the PP generator 330 stores generated PP images in PP storage 334, and the PN generator 332 stores generated PN images in PN storage 340. Once the classified image, PP image, and PN image are ready (or the classified image and one of the PP image and PN image are ready), the information is provided to report generator 342, which then generates data that can be used as a report for informing users about the classification of an original image, and contrasting explanations for the image's classifications in the form of one or both of the PN and PP images. The report data 346 output by the report generator 342 can be in any desired format, for example, xml, csv, json, pdf, or others.

Figure 4:
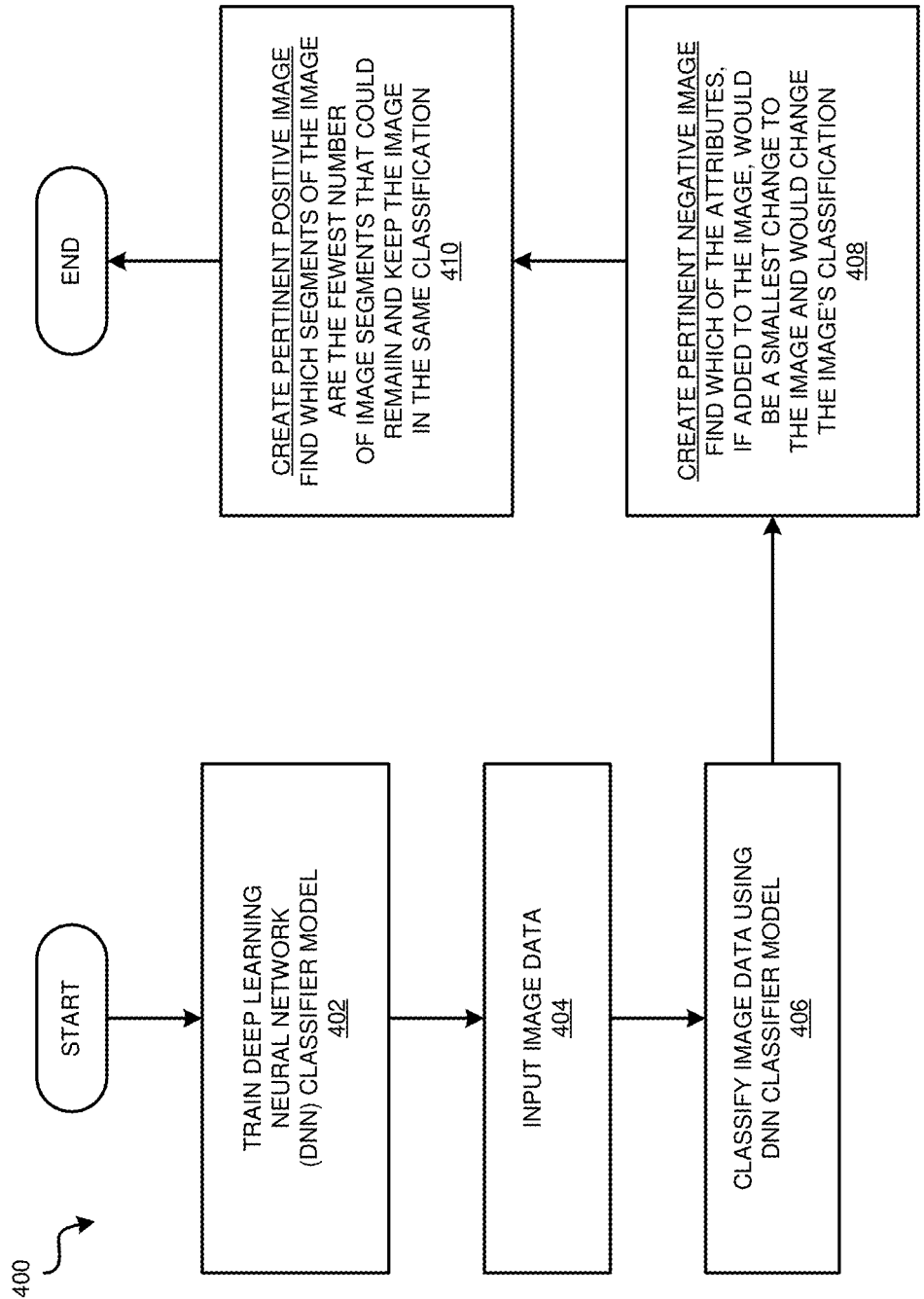
FIG. 4 depicts a flowchart of an example process for classifying data using machine learning that generates contrastive explanations in accordance with an illustrative embodiment.

With reference to FIG. 4, this figure depicts a flowchart of an example process 400 for classifying data using machine learning that generates contrastive explanations in accordance with an illustrative embodiment. In a particular embodiment, the neural network application 302 carries out the process 400. In an embodiment, the process 400 uses a DNN model to classify image data. In an embodiment, a DNN model is a classification model that requires training times that increase in exchange for more accurate predictions. However, in some embodiments, machine learning and/or classification techniques other than a DNN.

In an embodiment, at block 402, neural network application 302 generates a classifier model based on a DNN. In an embodiment, the DNN is selected from, and/or based on one or more known deep learning neural network structures/systems. In an embodiment, neural network application 302 trains the DNN using training data appropriate for the current domain being modeled. For example, in an embodiment, the classification model is intended to classify articles of clothing, neural network application 302 trains the classification model using images showing various articles of clothing, for example the well-known Fashion-MNIST fashion product database developed by Zalando SE. Also, models generated based on a DNN may be referred to as deep learning models or deep neural network models (DNN models).

In an embodiment, at block 404, once the model is trained, neural network application 302 employs the model to classify input image data representative of one or more original input images (or "original images"). In some embodiments, the input image data, which refers to image data input from a user or other system or application to the neural network application 302. In an embodiment, input image data is provided to the neural network application 302 as a real-time data stream. Also, in an embodiment, input image data is a collection of data, for example, data stored in a database, file system, or the like, or combination thereof. In an embodiment, the neural network application 302 pre-processes the input image data, or receives the input image data after pre-processing by another system or application, before using the model for classification of the input image data. In an embodiment, the pre-processing includes normalization of data, formatting, cleanup, or the like, or combination thereof.

In some embodiments, at block 406, the image classifier 320 uses the trained model to infer and make predictions about the each of the original input images in the input image data. For example, in some embodiments, the image classifier 320 assigns a class or label to each original input image. In some embodiments, the image classifier 320 assigns a class or label to a group of pixels using a segmentation algorithm. In an embodiment, the image classifier 320 predicts a classification for each original input image of the input image data and stores the classified image data in computer memory. In some embodiments, the image classifier 320 classifies images in the image data according to characteristics of pixels or superpixels of images in the image data.

In an embodiment, at blocks 408 and 410, the neural network application 302 generates contrastive explanations that serve as a humanly-interpretable reasons for the DNN's classification of the original input images. In some embodiments, the neural network application generates contrastive explanations for grayscale images, monochromatic images, and color images. In an embodiment, the neural network application 302 creates two types of contrastive explanations: a "Pertinent Negative" (or "PN") image at block 408 and a "Pertinent Positive" (or "PP") image at block 410.

A pertinent positive image is a modified version of the original input image, where the modifications are limited to removing portions of the original image and nothing is added. The pertinent positive image shows the smallest area of the original image that will still get the same classification by the DNN classifier as that of the original image. Thus, the pertinent positive image shows the areas of the original image that were significantly influential to the DNN classifier, and therefore provides some insight into why the DNN made the prediction that it made.

As a simple example, a pertinent negative of a grayscale image of a number "3" might be a vertical line, because the addition of a vertical like "1" to an image of a number "3" might result in re-classification of the image as a capital "B." If another possible class is the number "88," another potential pertinent negative would be the number followed by a capital epsilon "8E." There are multiple potential pertinent negatives, but the actual pertinent negative image is a modified version of the original image that satisfies this criteria:

(1) At least one high-level feature has been added to the original image;
(2) No portion of the original image has been removed;
(3) The DNN used at block 406 classifies this modified version of the original image in a class that is different from that of the original image; and
(4) Compared to all other modified versions of the original image that were created to satisfy (1) through (3), the pertinent negative image is most similar to the original image. In other words, the modified version (i.e., modified by adding a high level feature) of the original image that is most like the original image while having a different classification is the PN image.

To identify pertinent negatives, addition is simpler to define for grayscale images where a pixel with a value of "0" indicates no information and increasing the pixel value towards "1" indicates addition. However, for colored images with rich structure, there is not a clear "no information" value for a pixel. Therefore, defining an "addition" for a pixel value is not straight-forward and is unlikely to result in an intuitive result. Defining addition in a naive way, such as simply increasing the pixel or red-green-blue (RGB) channel intensities leads to uninterpretable images as the relative structure may not be maintained with the added portion being not necessarily interpretable. Moreover, even for grayscale images, just increasing values of pixels may not lead to humanly interpretable images or, if it is an interpretable image, the added portion will not necessarily be readily ascertainable to a human observer. Therefore, embodiments disclosed herein utilize high-level features as "additions." These high-level feature explanations provide an intuitive and humanly interpretable form of evidence that leads to realistic images with the additions also being interpretable to help explain why the model made the classification choices that it made.

Deep learning that utilizes a Convolutional Neural Network (CNN) segments data using convolutional filters to locate and identify learned, observable features in the data. Each filter or layer of the CNN architecture transforms the input data to increase the selectivity and invariance of the data. This abstraction of the data allows the neural network application to focus on the features in the data it is attempting to classify and ignore irrelevant background information. Deep learning operates on the understanding that many datasets include high level features which include low level features. While examining an image, for example, rather than looking for an object, it is more efficient to look for edges, which form motifs, which form parts, which form the object being sought. These hierarchies of features can be found in many different forms of data, such as speech and text, etc. Learned observable features include objects and quantifiable regularities learned by the machine.

In an embodiment, at block 408, the neural network application 302 creates a pertinent negative image by searching for an addition to an image, where the addition is a high-level feature that, if added to the original image, would be a smallest change that could be made to the image that would change the image's classification. In an embodiment, an algorithm for finding the pertinent negative includes the following notation:

$\chi$ denotes the feasible input space with $(x_0, t_0)$ being an example such that $x_0 \in \chi$ and $t_0$ is the predicted label obtained from a neural network classifier.

S denotes the set of superpixels that partition $x_0$ with $\mathcal{M}$ denoting a set of binary masks which when applied to $x_0$ produce images $\mathcal{M}(x_0)$ by selecting the corresponding superpixels from S.

$M_x$ denotes the mask corresponding to image $x=M_x(x_0)$.

D(.) denotes the data manifold (based on a Generative adversarial network (GAN) or a variational autoencoder (VAE)).

$z$ denotes the latent representation with $z_x$ denoting the latent representation corresponding to input x such that $x=D(z_x)$.

k denotes the number of (available or learned) interpretable features (latent or otherwise) which represent meaningful concepts (viz. moustache, glasses, smile) and $g_i(.)$, $\forall i \in \{1, \ldots, k\}$, are corresponding functions acting on these features with higher values indicating presence of a certain visual concept while lower values indicating its absence.

For example, suppose a KitchenEquip data set were created that included several thousand images of kitchen equipment, including images of plates, stock pots, mixing bowls, and ladles. Such a data set could have many potential different high-level (interpretable) features that could be used to differentiate one item from another. For example, the high-level features could include side walls and handles, where side walls distinguish the stock pots from plates and handles distinguish the ladles from mixing bowls. Such high-level features could potentially be used to build binary classifiers for each of the features, for example where a "1" indicates the presence of the feature and a "0" indicates the absence of the feature. These classifiers would be the $g_i(.)$ functions. On the other hand, for datasets with no high-level interpretable features, we could find latents by learning disentangled representations and choose those latents (with ranges) that are interpretable. Here the $g_i$ functions would be an identity map or negative identity map depending on which direction adds a certain concept (viz. sleeveless shirt to a long sleeve one). In an embodiment, these attribute functions are used as latent features for the generator in a causal graph, or given a causal graph for the desired attributes, the neural network application 302 learns these functions using known methods.

In an embodiment, the neural network application 302 follows a procedure for finding Pertinent Negatives that involves solving an optimization problem over the variable δ which is the outputted image. In an embodiment, the neural network application outputs the classification prediction f(x) of the classifier model for an example image x, where f(•) is any function that outputs a vector of prediction scores for all classes, such as prediction probabilities and logits (unnormalized probabilities) that are widely used in neural networks.

In an embodiment, the neural network application finds a pertinent negative that results in the creation of a discernible image that the DNN predicts to be in a different class than the original input image and where a minimal number of things have been "added" to the original input image without deleting anything to obtain the new image. If the neural network application finds such an image, the things that are added to the input image are referred to as the pertinent negatives. The modified input image having the pertinent negatives added is referred to as the pertinent negative image.

In an embodiment, the neural network application searches for the pertinent negatives using high-level interpretable features available for the dataset. Multiple public datasets have high-level interpretable features, while for others such features can be learned using classifiers for k high-level features, defined as functions $g_i(.)$, $\forall i \in \{1, \ldots, k\}$, where in each of these functions, a higher value indicates addition of a feature and a lower value indicates absence of a feature. In an embodiment, the neural network application uses these functions to define addition as introducing more concepts into an image without deleting any existing concepts. Formally, this corresponds to never decreasing the $g_i(.)$ from their original values based on the input image, but rather increasing them. The neural network application also seeks the class-changing high-level feature that results in a minimal number of additions to the input image, which corresponds to as few $g_i(.)$ as possible to increase in value (within their allowed ranges) that will result in the final image being in a different class. The neural network application also seeks a pertinent negative image that is realistic, or at least discernable, so the neural network application learns a manifold D on which it perturbs the image, as it seeks a final pertinent negative image to also lie on the manifold D after the additions. In an embodiment, the above goals and conditions give rise to the following optimization problem:

$$\min_{\delta \in \mathcal{X}} \gamma \sum_i \max\{g_i(x_0) - g_i(\mathcal{D}(z_\delta)), 0\} + \beta \|g(\mathcal{D}(z_\delta))\|_1 - \qquad (1)$$
$$c \cdot \min\{\max_{i \neq t_0}[f(\delta)]_i - [f(\delta)]_{t_0}, \kappa\} + \eta \|x_0 - \mathcal{D}(z_\delta)\|_2^2 + \nu \|z_{x_0} - z_\delta\|_2^2.$$

The first term in the objective function (1) above encourages the addition of high-level features $g_i(.)$s for the final image without being less than their original values. The second term encourages minimal addition of interpretable features. The third term is a designed loss function that encourages the modified image $\delta$ to be predicted by the DNN classifier model as a different class than the input image $t_0 = \arg\max_i[f(x_0)]_i$, where $[f(\delta)]_i$ is the i-th class prediction score of $\delta$. The hinge-like loss function pushes the modified input image $\delta$ to lie in a different class than $x_0$. The parameter $\kappa \geq 0$ is a confidence parameter that controls the separation between $[f(\delta)]_{t_0}$ and $\max_{i \neq t_0}[f(\delta)]_i$. The fourth ($\eta > 0$) and fifth terms ($\nu > 0$) encourage the final image to be close to the original image in the input and latent spaces. In an embodiment, the neural network application 302 has a threshold for each of the high-level features $g_i(.)$s, where only an increase in value beyond that threshold would imply a meaningful addition. The advantage of defining addition in this manner is that not only are the final images interpretable, but so are the additions, and we can clearly elucidate which (concepts) should be necessarily absent to maintain the original classification.

In an embodiment, the neural network application solves for pertinent negatives using the objective function (1). The $L_1$ regularization term is penalizing a non-identity and complicated function $\|g(D(z_\delta))\|_1$ of the optimization variable $\delta$ involving the data manifold D, so proximal methods are not applicable. Instead, neural network application uses a large number of iterations (e.g., in a range from 500 to 1500 iterations, such as 1000 intervals) of standard subgradient descent to solve the function (1). In an embodiment, the neural network application finds a pertinent negative by setting it to be the iterate having the smallest $L_2$ distance $\|z_{x_0} - z_\delta\|_2$ to the latent code of $x_0$, among all iterates where prediction score of solution $\delta^*$ is at least $[f(x_0)]_{t_0}$.

Figure 6:
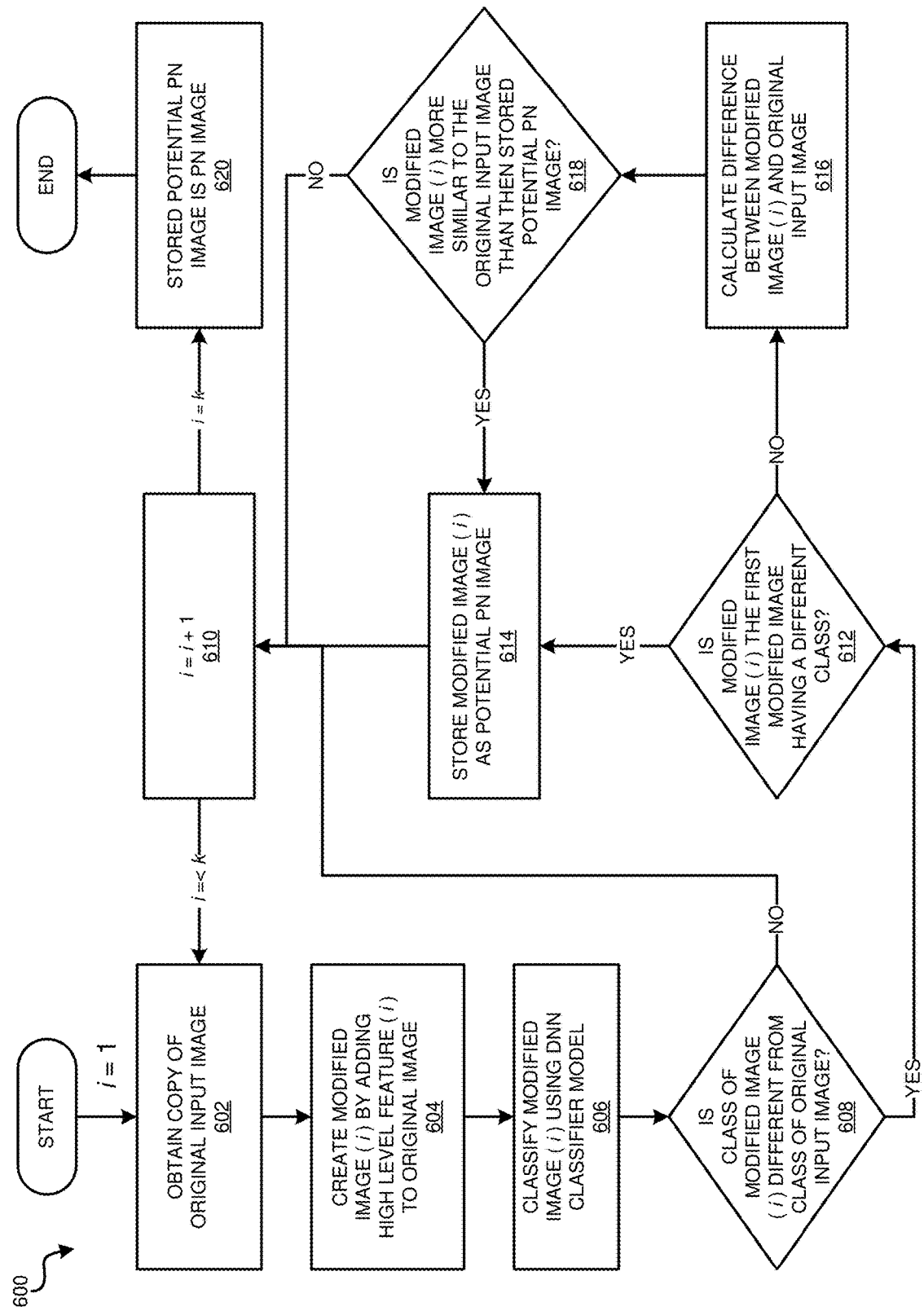
FIG. 6 depicts a flowchart of an example process for creating a Pertinent Negative image in accordance with an illustrative embodiment.

In an embodiment, the process [FIG. 6] To identify pertinent negatives. In an embodiment, at block 410, the neural network application 302 creates a pertinent positive image by searching for a minimal set of important pixels or superpixels which by themselves are sufficient for the classifier to output the same class as the original example. More formally, for an example image $x_0$, our goal is to find an image $\delta \in \mathcal{M}(x_0)$ such that $\arg\max_i[\text{Pred}(x_0)]_i = \arg\max_i[\text{Pred}(\delta)]_i$ (i.e. same prediction), with $\delta$ containing as few superpixels and interpretable concepts from the original image as possible. This leads to the following optimization problem:

$$\min_{\delta \in \mathcal{M}(x_0)} \gamma \sum_i \max\{g_i(\delta) - g_i(x_0), 0\} - \qquad (2)$$
$$c \cdot \min\{[f(\delta)]_{t_0} - \max_{i \neq t_0}[f(\delta)]_i, \kappa\} + \beta \|M_\delta\|_1.$$

The first term in the objective function (2) above penalizes the addition of attributes to encourage a sparse pertinent positive explanation. The second term is a designed loss function that encourages the modified image $\delta$ to be predicted by the DNN classifier model as a same class as the input image and is minimized when $[f(\delta)]_{t_0}$ is greater than $\max_{i \neq t_0}[f(\delta)]_i$ by at least $\kappa \geq 0$, which is a margin/confidence parameter. Parameters $\gamma$, c, $\beta \geq 0$ are the associated regularization coefficients.

In an embodiment, the neural network application uses the above formulation to optimize over superpixels, which subsumes the case of just using pixels, to provide more interpretable results on image datasets.

In an embodiment, the neural network application solves for pertinent positives using the objective function (2) by first relaxing the binary mask $M_\delta$ on superpixels to be real-valued (each entry is between [0, 1]) and then apply an algorithm to solve such optimization problems, for example the well-known standard Iterative Soft Thresholding Algorithm (ISTA) that efficiently solves optimization problems with $L_1$ regularization. In an embodiment, the neural network application runs several iterations (e.g., in a range of 70 to 130 iterations, such as 100 iterations) of ISTA and obtains a solution $M_{\delta^*}$ that has the smallest $L_1$ norm and satisfies the prediction of $\delta^*$ being within margin $\kappa$ of at least $[f(x_0)]_{t_0}$, and then ranks the entries in $M_{\delta^*}$ according to their values in descending order and subsequently adds ranked superpixels until the DNN classifier model predicts masked image is predicts $[f(x_0)]_{t_0}$.

Figure 5:
FIG. 5 depicts a block diagram of an exemplary output report from a process for classifying data using machine learning that generates contrastive explanations in accordance with an illustrative embodiment.
Figure 5:
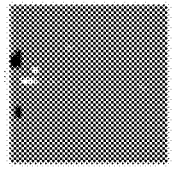
Figure 5:
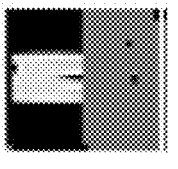
Figure 5:
Figure 5:
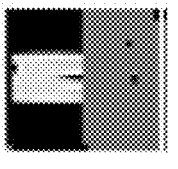
Figure 5:
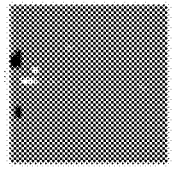

With reference to FIG. 5, this figure depicts a block diagram of an embodiment of an output report 500 generated by the neural network application 302 for reporting the results of a classification process that includes generating contrastive explanations in accordance with an illustrative embodiment. In an embodiment the report 500 includes three repeating rows: classification row 502, image row 504, and contrastive explanations row 506. In an embodiment, the report 500 includes three columns: input image column 508, pertinent negative column 510, and pertinent positive column 512.

In an embodiment, the block at the intersection of image row 504 and input image column 508 shows an input image, for example as input at block 504 in FIG. 3. The block at the intersection of classification row 502 and input image column 508 shows the classification predicted by a classifier model for the corresponding input image, for example as predicted by the DNN classifier model at block 506 in FIG. 3. The block at the intersection of contrastive explanations row 506 and pertinent negative column 510 shows an attribute (e.g., high-level feature) that resulted from a process for finding pertinent negatives, for example as found at block 408 in FIG. 4. The block at the intersection of image row 504 and pertinent negative column 510 shows a pertinent negative image, which is a modified version of the input image that has been altered to include the corresponding pertinent negative. The block at the intersection of classification row 502 and pertinent negative column 510 shows the classification predicted by a classifier model for the corresponding pertinent negative image. The block at the intersection of contrastive explanations row 506 and pertinent positive column 512 shows a number of features (e.g., superpixels) that resulted from a process for finding pertinent positives, for example as found at block 410 in FIG. 4. The block at the intersection of image row 504 and pertinent positive column 512 shows a pertinent positive image, which is a modified version of the input image that includes only the minimum portions of the input image that can still result in it being classified the same as the input image. The block at the intersection of the pertinent positive column 512 and the classification row 502 is not used because the pertinent positive image will, by definition, have the same classification as the input image. The block at the intersection of the contrastive explanations row 506 and input image column 508 is not used because there is no contrastive explanation information generated during the initial input and classification stage of the overall process.

The report 500 provides an intuitive and human-readable explanation to aid in understanding decisions made by the classifier. For example, the first image row 502 shows an input image classified as "Shirt." The pertinent negative image has a new classification that is "coat" and the pertinent negative feature that was added was "wider sleeves, waist." This indicates that the classifier model focused on the portion of the image around the sleeves and waistline to determine whether the image is a shirt or coat. The pertinent positive image also provides insight into the decision-making process of the classifier. The classifier requires at least 15 superpixel/features to classify this image as "Shirt" and much of the decision was based on portions of the image around the collar and buttons.

As another example, the second image row 502 shows an input image classified as "Trouser." The pertinent negative image has a new classification that is "Dress" and the pertinent negative features that were added was "middle piece of fabric." This indicates that the classifier model focused on the gap portion between the trouser legs to determine whether the image is a trouser or dress. The pertinent positive image also supports this conclusion because about half of the original image remains, which is enough to begin to see the separate trouser legs.

With reference to FIG. 6 this figure depicts a flowchart of an example process 600 for creating a PN image in accordance with an illustrative embodiment. In a particular embodiment, the PN generator 332 carries out the process 600. In an embodiment, the process 600 uses a set of k high-level features $g_i(.)$, $\forall i \in \{1, \ldots, k\}$, to modify respective duplicates of the original image (i=1 to k) to identify a modified original image that is most similar to the original image but classified differently by the DNN.

In an embodiment, at block 602, the process obtains a copy of the original input image. Next, at block 604, the process uses high level feature $g_i(.)$, to create a modified image (i) by adding high level feature $g_i(.)$ to original image. For example, in an embodiment the original input image is a mixing bowl and the high-level feature $g_i(.)$ is a pan handle, the original input image is modified to show a mixing bowl having a pan handle. Next, at block 606, the DNN classifier predicts a class for the modified image. Following the previous example where an image of a mixing bowl was modified to have a pan handle, in some embodiments the DNN that correctly classified the mixing bowl as a mixing bowl will classify the modified image as a wok rather than as a mixing bowl because of the addition of the handle. In other embodiments, the pan handle is not enough to cause the DNN to classify the mixing bowl differently. At block 608, the process determines whether the modified image has a classification that is different from that of the original image. If so, the process continues to block 610 where the counter i is incremented. If not, the process continues to block 612, where the process checks whether this modified image is the only modified image to have been classified differently than the original image. If so, the process continues to block 614 where the process stores the modified image (i) in electronic memory as a potential PN image. Otherwise, the process continues to block 616. At block 616, the process calculates the difference between modified image (i) and the original input image. At block 618, the process determines whether the modified image (i) is more similar to the original input image than then stored potential PN image. If so, then the process continues to block 614 where the process stores the modified image (i) in electronic memory as a potential PN image. In some embodiments, any previous potential PN image is overwritten or otherwise deleted.

In some embodiments, after block 614, the process continues to block 610 where the counter i is incremented. In some embodiments, if there are still high level features to check (i≤k), the process continues back to the beginning at block 602. Otherwise, the process continues to block 620 where the modified image remaining stored as the potential PN image is considered the PN image.

Figure 7:
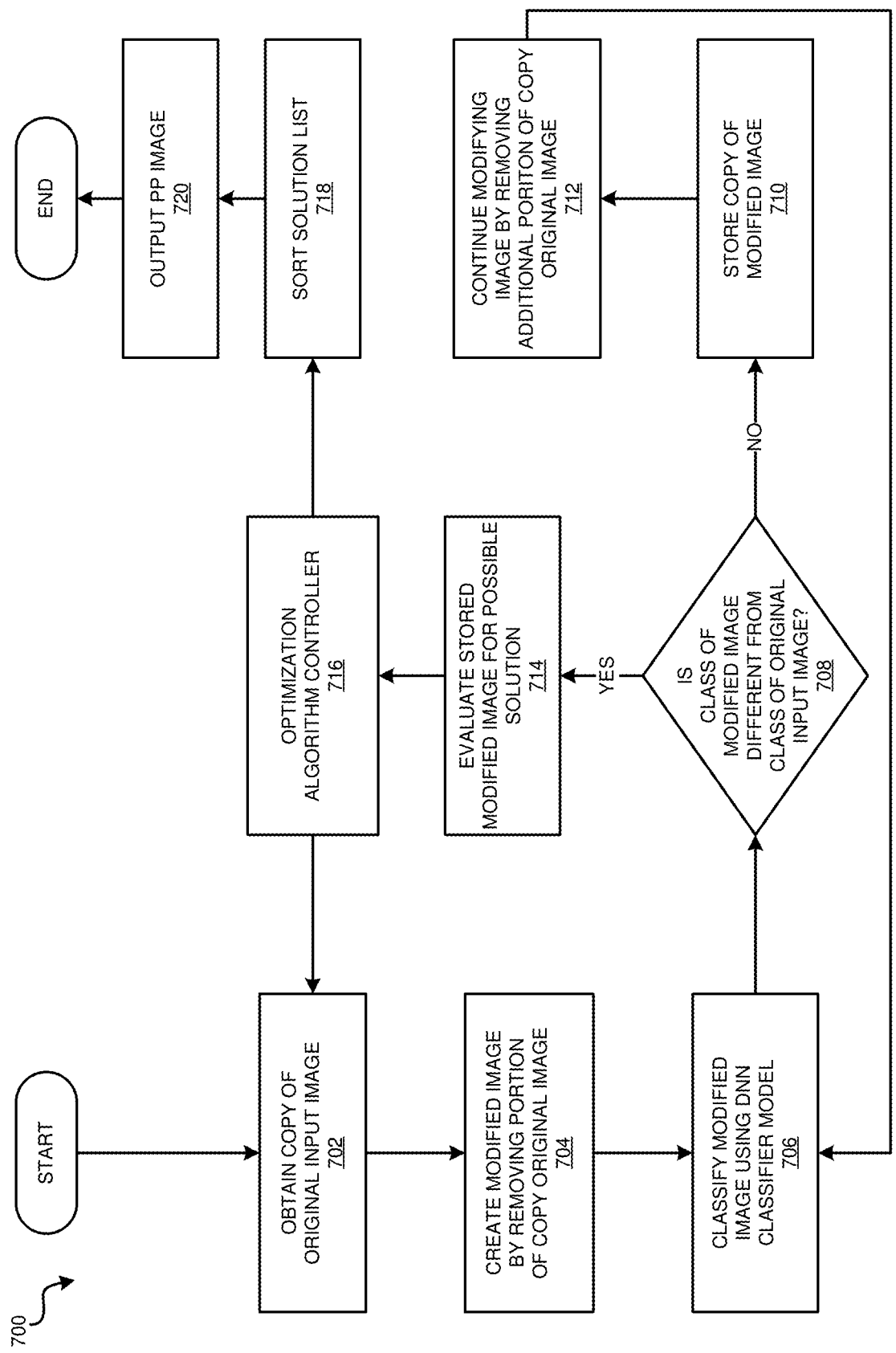
FIG. 7 depicts a flowchart of an example process for creating a Pertinent Positive image in accordance with an illustrative embodiment.

With reference to FIG. 7 this figure depicts a flowchart of an example process 700 for creating a PP image in accordance with an illustrative embodiment. In a particular embodiment, the PP generator 330 carries out the process 700. In an embodiment, the process 700 uses an optimization algorithm to iteratively remove portions of a copy of the original input image and use the DNN to predict the classification of the modified image, which continues until the DNN no longer classifies the modified image to have the same class as the original image. The last version of that modified image that still had the same class as the original image is saved in an array of other copies of the original image that went through the same process, but with different patterns removed. The final PP image is selected from that array.

In an embodiment, at block 702, the process obtains a copy of the original input image. Next, at block 704, the process creates a modified image by removing a portion of the image. In some embodiments, the process removes selected pixels from the image. In some embodiments, the process removes selected superpixels or groups of superpixels from the image. Next, at block 706, the DNN classifier predicts a class for the modified image. At block 708, the process determines whether the modified image has a classification that is different from that of the original image. If the classification is still the same ("No" at block 708), the process continues to block 710 where a copy of the modified image is stored. In some embodiments, if a less-modified image is stored from a previous iteration of the loop from block 706 to 712, the current image overwrites the previously-stored image so that the stored image is always an image that has been most heavily modified without being reclassified at block 708. Next, at block 712, the process removes more of the modified image. The process then loops back to block 706, where the DNN classifier predicts a class for the modified image.

Eventually the image will have been modified to such an extent that the DNN will predict a different class for the modified image. At this point, the process continued to block 724, where the image stored at block 710 to verify whether it satisfies other parameters, such as L regularization parameters. If so, the image is added to an array of images obtained from the process from block 702 to 712. At block 716, an algorithm controller determines whether to continue with another copy of the original image by returning to block 702. Otherwise, the process continues to block 718, where the array of saved images is sorted to find an image having more recognizable results in a smallest remaining portion of the original input image. At block 720, the image best satisfying the criteria is output as the PP image.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for generating contrastive information for a classifier prediction, the computer implemented method comprising:
   receiving, by one or more processors, image data representative of an original input image;
   creating, by the one or more processors, a modified input image by adding a high-level feature to a copy of the original input image; and
   determining, by the one or more processors, using a deep learning classifier model, that the modified input image is a pertinent-negative image that is most similar to the original input image in a set of modified input images, wherein the modified input image has a classification that is different from a classification of the original input image.

2. The computer implemented method of claim 1, further comprising:
   generating, by the one of more processors, a report that includes a visual representation of the pertinent-negative image.

3. The computer implemented method of claim 1, further comprising:
   creating, by the one or more processors, a pertinent-positive image that is a modified version of the original input image and that includes fewer than all superpixels of the original input image while still being predicted by the deep learning classifier model to be in the classification of the original input image.

4. The computer implemented method of claim 3, further comprising:
   comparing a plurality of modified images to identify a candidate modified image that has an amount of the original input image remaining while still being classified in the classification of the original input image, wherein each of the plurality of modified images is a modified version of the original input image having fewer than all portions of the input image.

5. The computer implemented method of claim 1, wherein the determining of the pertinent-negative image includes determining that the pertinent-negative image is a result with a smallest change to the original input image from among other potential modifications to the original input image.

6. The computer implemented method of claim 1, wherein the original input image is a multiple-color image.

7. The computer implemented method of claim 1, wherein the determining includes identifying that the pertinent-negative image will be classified by the deep learning classifier model as a second classification that is different from a first classification of the original input image.

8. A computer usable program product for generating contrastive information for a classifier prediction, the computer usable program product comprising a computer-readable storage device, and program instructions stored on the storage device, the stored program instructions comprising:

program instructions to receive, by one or more processors, image data representative of an original input image;

program instructions to create, by the one or more processors, a modified input image by adding a high-level feature to a copy of the original input image; and program instructions to determine, by the one or more processors, using a deep learning classifier model, that the modified input image is a pertinent-negative image that is most similar to the original input image in a set of modified input images, wherein the modified input image has a classification that is different from a classification of the original input image.

9. A computer usable program product of claim 8, further comprising program instructions to generate, by the one or more processors, a report that includes a visual representation of the pertinent-negative image.

10. A computer usable program product of claim 8, further comprising:

program instructions to create, by the one or more processors, a pertinent-positive image that is a modified version of the original input image and that includes fewer than all superpixels of the original input image while still being predicted by the deep learning classifier model to be in the classification of the original input image.

11. A computer usable program product of claim 10, further comprising:

program instructions to compare a plurality of modified images to identify a candidate modified image that has an amount of the original input image remaining while still being classified in the classification of the original input image, wherein each of the plurality of modified images is a modified version of the original input image having fewer than all portions of the input image.

12. A computer usable program product of claim 8, wherein the program instructions to determine the pertinent-negative image includes program instructions to determine that the pertinent-negative image is a result with a smallest change to the original input image from among other potential potential modifications to the original input image.

13. A computer usable program product of claim 8, wherein the input image is a multiple-color image.

14. A computer usable program product of claim 8, wherein the program instructions to determine includes program instructions to identify that the pertinent-negative image will be classified by the deep learning classifier model as a second classification that is different from a first classification of the original input image.

15. A computer system comprising a processor, a computer-readable memory, and a computer-readable storage device, and program instructions stored on the storage device for execution by the processor via the memory, the stored program instructions comprising:

program instructions to receive, by one or more processors, image data representative of an original input image;

program instructions to create, by the one or more processors, a modified input image by adding a high-level feature to a copy of the original input image; and program instructions to determine, by the one or more processors, using a deep learning classifier model, that the modified input image is a pertinent-negative image that is most similar to the original input image in a set of modified input images, wherein the modified input image has a classification that is different from a classification of the original input image.

16. The computer system of claim 15, further comprising program instructions to generate, by the one or more processors, a report that includes a visual representation of the pertinent-negative image.

17. The computer system of claim 15, further comprising:

program instructions to create, by the one or more processors, a pertinent-positive image that is a modified version of the original input image and that includes fewer than all superpixels of the original input image while still being predicted by the deep learning classifier model to be in the classification of the original input image.

18. The computer system of claim 17, further comprising:

program instructions to compare a plurality of modified images to identify a candidate modified image that has an amount of the original input image remaining while still being classified in the classification of the original input image, wherein each of the plurality of modified images is a modified version of the original input image having fewer than all portions of the input image.

19. The computer system of claim 15, wherein the program instructions to determine the pertinent-negative image includes program instructions to determine that the pertinent-negative image is a result with a smallest change to the original input image from among other potential modifications to the original input image.

20. The computer system of claim 15, wherein the program instructions to determine includes program instructions to identify that the pertinent-negative image will be classified by the deep learning classifier model as a second classification that is different from a first classification of the original input image.

* * * * *